United States Patent
Yang et al.

(10) Patent No.: US 10,566,893 B2
(45) Date of Patent: Feb. 18, 2020

(54) ZVS CONTROL CIRCUIT FOR USE IN A FLYBACK POWER CONVERTER

(71) Applicant: RICHTEK TECHNOLOGY CORPORATION, Zhubei, Hsinchu (TW)

(72) Inventors: Ta-Yung Yang, Taoyuan (TW); Tzu-Chen Lin, Changhua (TW); Li-Di Luo, Taichung (TW); Pei-Sheng Tsu, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 16/134,906

(22) Filed: Sep. 18, 2018

(65) Prior Publication Data

US 2019/0149032 A1 May 16, 2019

Related U.S. Application Data

(60) Provisional application No. 62/584,714, filed on Nov. 10, 2017.

(30) Foreign Application Priority Data

May 18, 2018 (CN) .......................... 2018 1 0480345

(51) Int. Cl.
*H02M 3/335* (2006.01)
*H02M 1/08* (2006.01)
*H02M 1/00* (2006.01)

(52) U.S. Cl.
CPC ....... *H02M 1/083* (2013.01); *H02M 3/33592* (2013.01); *H02M 2001/0058* (2013.01)

(58) Field of Classification Search
CPC .................. H02M 3/33592; H02M 2001/0058
See application file for complete search history.

(56) References Cited

U.S. PATENT DOCUMENTS

| 6,069,803 A * | 5/2000 | Cross ................. H02M 3/33569 |
| | | 363/21.14 |
| 9,444,357 B1 * | 9/2016 | Matthews ............. G06F 1/3287 |
| 10,128,766 B1 * | 11/2018 | Strijker ............. H02M 3/33584 |
| 2010/0033995 A1 * | 2/2010 | Lin .................... H02M 3/33592 |
| | | 363/21.14 |
| 2017/0155335 A1 * | 6/2017 | Chang ..................... H02M 1/08 |

* cited by examiner

*Primary Examiner* — Harry R Behm
(74) *Attorney, Agent, or Firm* — Tung & Associates

(57) ABSTRACT

A ZVS (zero voltage switching) control circuit for use in a flyback power converter includes a primary side controller circuit, a secondary side controller circuit, and a pulse transformer. In one switching cycle, a synchronous rectifier transistor is turned ON twice to generate a circulation current at the primary side winding, and after the synchronous rectifier transistor is turned OFF, the power transistor is turned ON for zero voltage switching. A synchronous signal coupled between the primary side and the secondary side is employed to synchronize the power transistor and the synchronous transistor. The synchronous signal also triggers an SR-ZVS pulse to turn ON the synchronous rectifier transistor for achieving the zero voltage switching when the power transistor is turned ON.

16 Claims, 8 Drawing Sheets

ZVS CONTROL CIRCUIT FOR USE IN A FLYBACK POWER CONVERTER

CROSS REFERENCE

The present invention claims priority to U.S. 62/584,714, filed on Nov. 10, 2017, and to CN 201810480345.X, filed on May 18, 2018.

BACKGROUND OF THE INVENTION

Field of Invention

The present invention relates to a control circuit for use in a flyback power converter; particularly, it relates to a ZVS (Zero Voltage Switching) control circuit for use in a flyback power converter.

Description of Related Art

FIG. 1 shows a prior art flyback power converter (flyback power converter 1), wherein the primary side controller circuit 80 controls the power transistor QP to operate the power transformer 10 to generate an output voltage Vo. The secondary controller circuit 90 generates a synchronous rectifier (SR) control signal VG to control a synchronous rectifier transistor QSR for synchronous rectification at the secondary side. "Synchronous rectification" means that the synchronous rectifier transistor QSR switches in substantially opposite phase to the power transistor QP.

The prior art in FIG. 1 has a drawback that the synchronous rectifier transistor QSR cannot be precisely synchronized with the power transistor QP at the primary side. Besides, the power efficiency is low since the power transistor QP is not zero voltage switching. "Zero voltage switching" means that the power transistor QP is turned ON at a time point when the voltage difference across its drain and source is substantially zero.

Compared to the prior art in FIG. 1, the present invention is advantageous in that the synchronous rectifier transistor QSR can be precisely synchronized with the power transistor QP at the primary side. Besides, the power efficiency is greatly improved since the power transistor QP is zero voltage switching with the same synchronous signal.

SUMMARY OF THE INVENTION

From one perspective, the present invention provides a zero voltage switching (ZVS) control circuit, configured to operably control a flyback power converter, the ZVS control circuit comprising: a primary side controller circuit, configured to operably generate a switching signal and an SR synchronous signal, wherein the switching signal controls a power transformer through a power transistor to generate an output voltage; a secondary side controller circuit, configured to operably generate an SR control signal for controlling a synchronous rectifier transistor at a secondary side of the power transformer, wherein the SR control signal includes an SR-control pulse and an SR-ZVS pulse, wherein the SR-control pulse controls the synchronous rectifier transistor to be ON for an SR time period; and a pulse transformer, configured to couple the SR synchronous signal from the primary side controller circuit to the secondary side controller circuit to generate the SR control signal; wherein the SR control signal is triggered to generate the SR-ZVS pulse according to the SR synchronous signal, and the synchronous rectifier transistor is turned ON for a predetermined ZVS time period by the SR-ZVS pulse; wherein when the synchronous rectifier transistor is turned OFF at an end of the SR-ZVS pulse, the power transistor is turned ON, to achieve zero voltage switching.

In one embodiment, after the synchronous rectifier transistor is turned OFF at the end of the SR-ZVS pulse, the power transistor is turned ON after a predetermined ZVS delay time period from a turned-OFF timing of the synchronous rectifier transistor.

In one embodiment, the synchronous rectifier transistor is turned ON by the SR-ZVS pulse when the power transformer is operated in a discontinuous current mode (DCM).

In one embodiment, after the power transistor is turned OFF, the synchronous rectifier transistor is turned ON for the SR time period by the SR-control pulse for synchronous rectification at the secondary side, wherein after the SR-control pulse ends, the synchronous rectifier transistor is turned ON by the SR-ZVS pulse which is triggered when the SR synchronous signal is received.

In one embodiment, the SR control signal generates the SR-ZVS pulse to turn ON the synchronous rectifier transistor when a voltage of a drain terminal of the synchronous rectifier transistor is lower than a low-voltage threshold.

In one embodiment, after the synchronous rectifier transistor is turned OFF at the end of the SR-ZVS pulse, the ZVS delay time period is started when a voltage of an auxiliary winding of the power transformer is lower than a primary-side-winding threshold, wherein the auxiliary winding is coupled to the primary side controller circuit.

In one embodiment, a pulse width of the SR synchronous signal determines the starting timing of the SR-ZVS pulse.

In one embodiment, the primary side controller circuit determines a switching frequency of the SR synchronous signal or the switching signal.

In one embodiment, a pulse width of the SR synchronous signal is shorter than 1 μsec.

From another perspective, the present invention provides a zero voltage switching (ZVS) control circuit, configured to operably control a flyback power converter, the ZVS control circuit comprising: a primary side controller circuit, configured to operably generate a switching signal which controls a power transformer through a power transistor to generate an output voltage; a secondary side controller circuit, configured to operably generate an SR control signal and a PWM synchronous signal, wherein the SR control signal controls a synchronous rectifier transistor, wherein the SR control signal includes an SR-control pulse and an SR-ZVS pulse, wherein the SR-control pulse controls the synchronous rectifier transistor to be ON for an SR time period; and a pulse transformer, configured to operably couple the PWM synchronous signal from the secondary side controller circuit to the primary side controller circuit to generate the switching signal; wherein before the PWM synchronous signal delivers a synchronous pulse, the synchronous rectifier transistor is turned ON for a predetermined ZVS time period by the SR-ZVS pulse; wherein when the synchronous rectifier transistor is turned OFF at the end of the SR-ZVS pulse, the PWM synchronous signal is generated to trigger the power transistor to be turned ON, to achieve zero voltage switching.

In one embodiment, the SR-ZVS pulse is not generated during a light load condition of the flyback power converter.

In one embodiment, the secondary side controller circuit starts the ZVS delay time period after the synchronous rectifier transistor is turned OFF at the end of the SR-ZVS pulse.

In one embodiment, the secondary side controller circuit determines a switching frequency of the switching signal.

In one embodiment, a pulse width of the PWM synchronous signal is shorter than 1 μsec.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
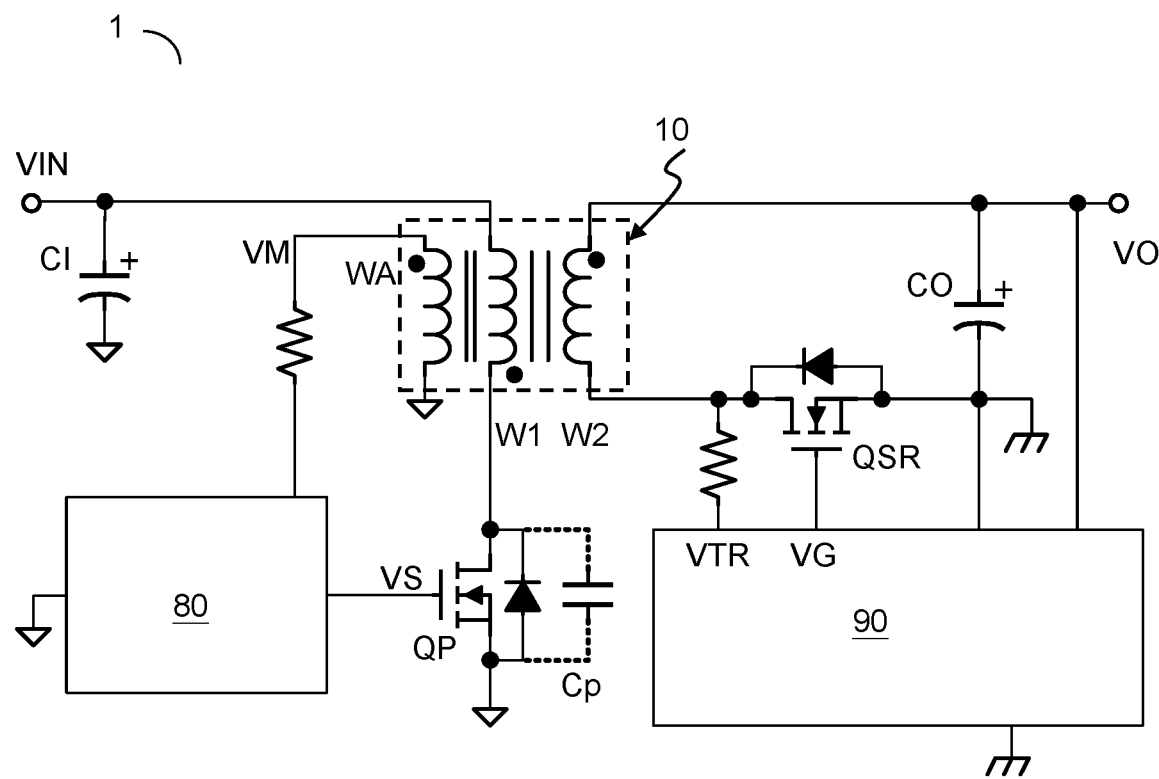
FIG. 1 shows a schematic diagram of a prior art flyback power converter.
Figure 2A:
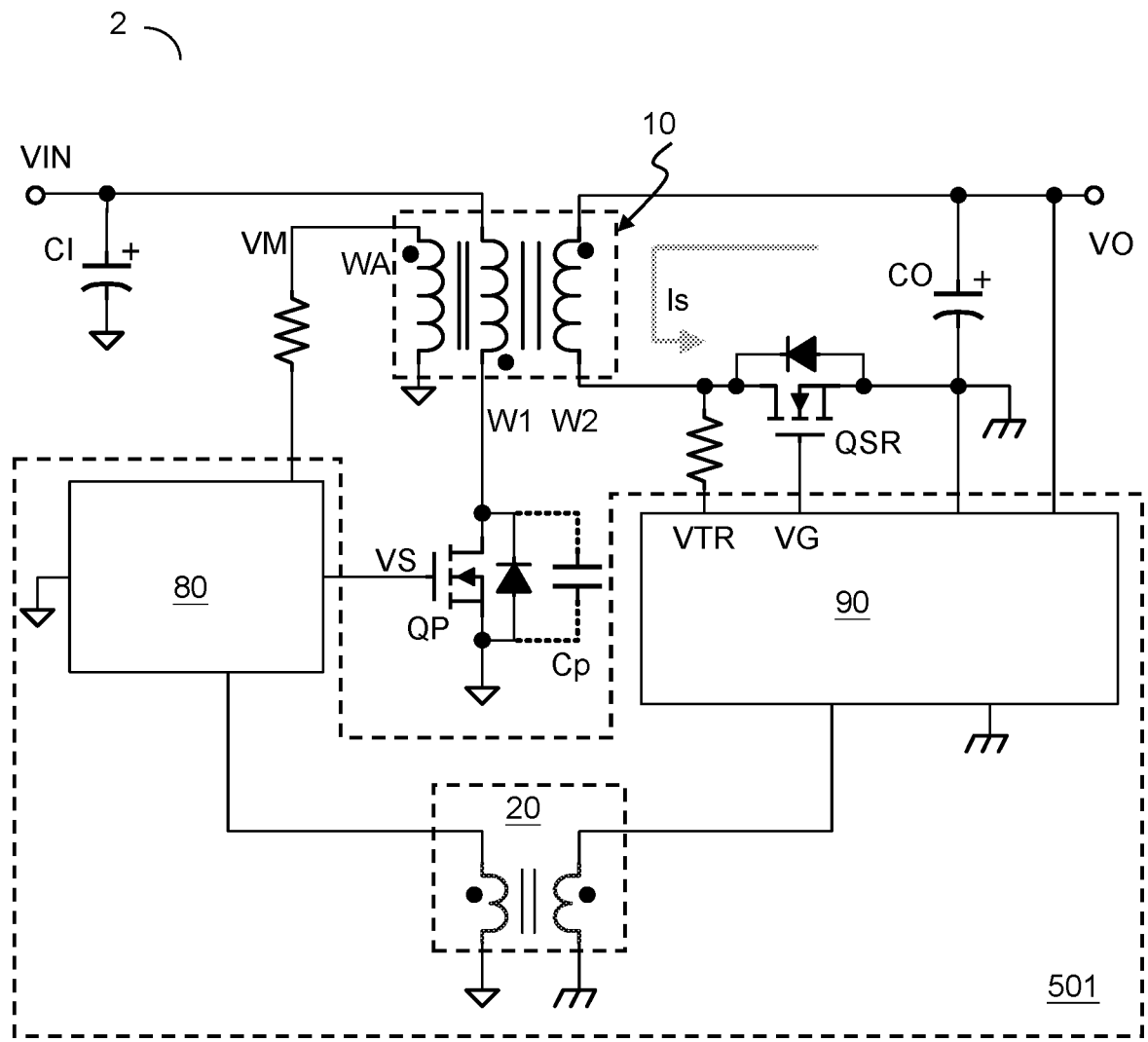
FIGS. 2A-2B show schematic diagrams of embodiments of the ZVS control circuit according to the present invention.

FIG. 2A shows a schematic diagram of one embodiment of the ZVS control circuit according to the present invention (ZVS control circuit 501). The ZVS control circuit 501 is configured to operably control a flyback power converter 2. The ZVS control circuit 501 comprises a primary side controller circuit 80, a secondary side controller circuit 90, and a pulse transformer 20. The primary side controller circuit 80 is configured to operably generate a switching signal Vs. The switching signal Vs controls a power transformer 10 through a power transistor QP to generate an output voltage Vo. The secondary side controller circuit 90 is configured to operably generate an SR control signal VG to control a synchronous rectifier transistor QSR for synchronous rectification at the secondary side.

Figure 2B:
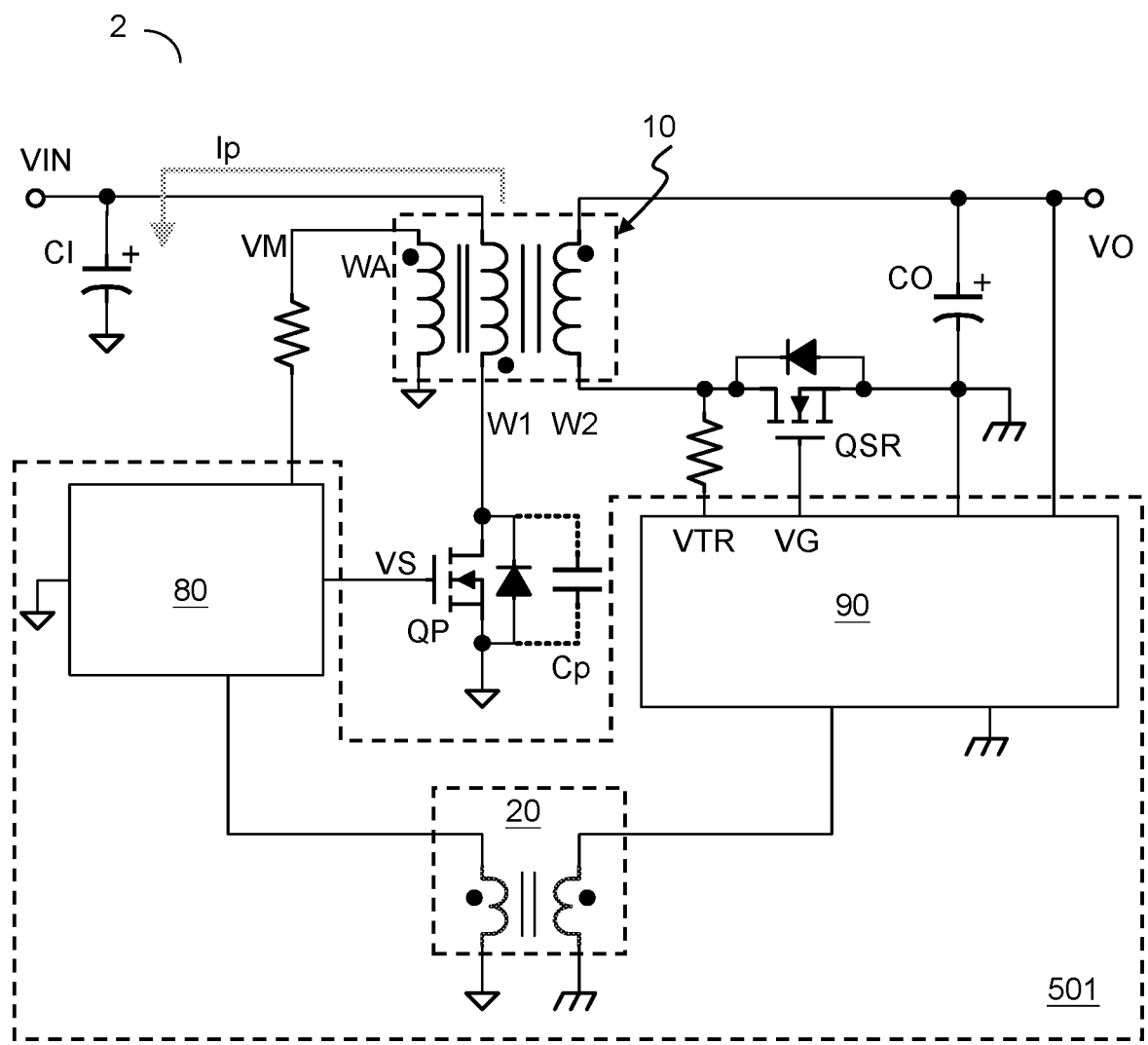

After the power transistor is turned ON and OFF, and when the primary side winding W1 is demagnetized and the synchronous rectifier transistor QSR is turned ON, the power transformer will induce a circulation current Is at the secondary side winding W2 (as shown in FIG. 2A), wherein the circulation current Is will transfer energy from the output capacitor CO to the secondary side winding W2. Afterward, when the synchronous rectifier transistor QSR is turned OFF, the power transformer 10 will induce a circulation current Ip at the primary side winding W1 (as shown in FIG. 2B). According to the present invention, the circulation current Ip at the primary side winding W1 can discharge a parasitic capacitor Cp of the power transistor QP substantially to 0V, and the charges of the parasitic capacitor Cp will be transferred to the input capacitor CI. Then, the power transistor QP can achieve zero voltage switching (ZVS) when the power transistor QP is turned ON in the next and further cycles.

The term "zero voltage switching" refers to a condition that: before a transistor (such as QP) is turned ON, the parasitic capacitor (e.g. a parasitic capacitor Cp across drain and source) of the transistor is substantially discharged to 0V by a discharging current and the charges of the parasitic capacitor for example can be transferred to a storage device (such as the input capacitor CI), such that when the transistor is turned ON, the drain-source voltage of the transistor is substantially 0V. Since the charges on the parasitic capacitor is not discharged by the transistor with its conduction resistance, the power conversion efficiency can be improved.

Note that although the parasitic capacitor being discharged to 0V is preferred, however due to non-idealities caused by for example imperfection of components or imperfect matching among components, the voltage of the parasitic capacitor may not be discharged exactly to 0V, but just close to the 0V. In other words, according to the present invention, a certain level of error between 0V and the voltage on the parasitic capacitor after discharge is acceptable, and therefore the term "substantially" is used to mean that an insignificant error within a tolerable range is acceptable.

Figure 3:
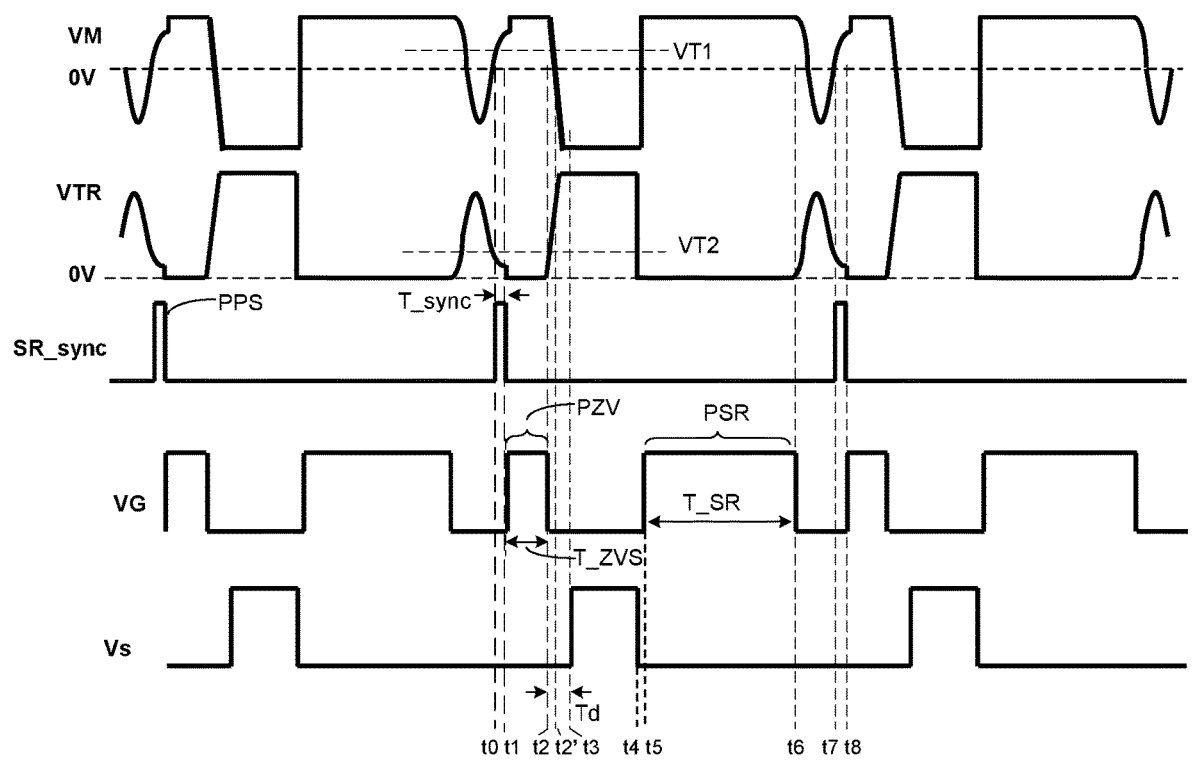
FIG. 3 shows waveforms corresponding to the embodiments of the ZVS control circuit according to the present invention.

FIG. 3 shows waveforms corresponding to the embodiments of the ZVS control circuit according to the present invention. According to the present invention, the SR control signal VG for example includes an SR-control pulse PSR and an SR-ZVS pulse PZV. The SR-control pulse PSR is configured to operably control the synchronous rectifier transistor QSR to be ON for an SR time period T_SR. The SR time period T_SR is substantially synchronous with the conduction time of the circulation current Is, whereby the power conversion efficiency can be improved. The SR-ZVS pulse PZV is configured to operably control the power transistor QP for achieving zero voltage switching.

The pulse transformer 20, coupled between the primary side controller circuit 80 and the secondary side controller circuit 90, delivers a synchronous signal between the primary side controller circuit 80 and the secondary side controller circuit 90 to synchronize the switching signal and the SR control signal VG. More specifically, the pulse transformer 20 can synchronize the SR-control pulse PSR and the SR-ZVS pulse PZV by the synchronous signal to achieve synchronous rectification and the zero voltage switching at the same time, which will be described in detail later.

Figure 4:
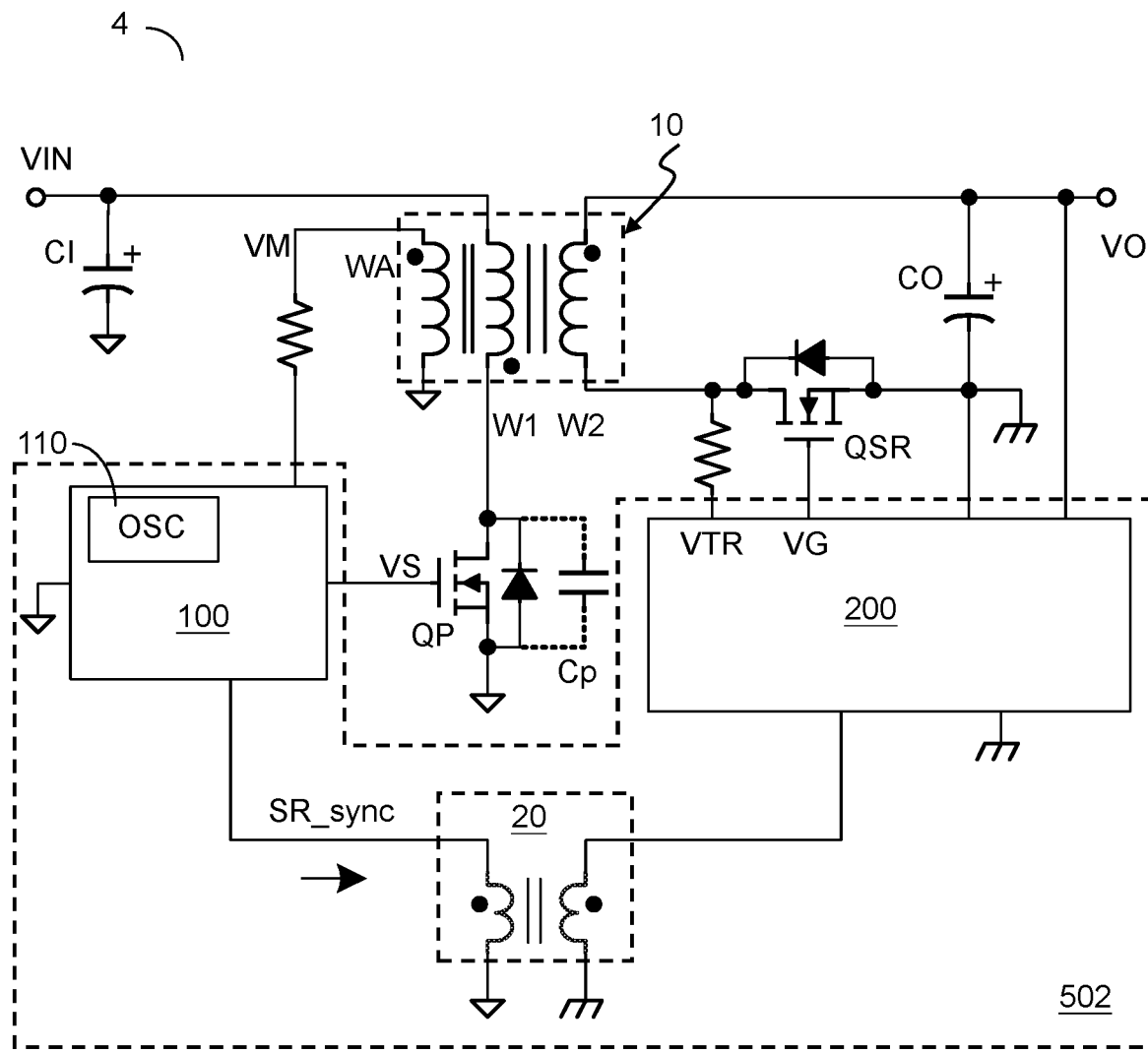
FIG. 4 shows a schematic diagram of an embodiment of the ZVS control circuit according to the present invention.

FIG. 4 shows a schematic diagram of an embodiment of the ZVS control circuit according to the present invention (ZVS control circuit 502). In this embodiment, the primary side controller circuit 100 is configured to further generate an SR synchronous signal SR_sync. The pulse transformer 20 couples the SR synchronous signal SR_sync from the primary side controller circuit 100 to the secondary side controller circuit 200 to generate the SR control signal VG. Also referring to FIG. 3, more specifically, the SR control signal VG is triggered to generate the SR-ZVS pulse PZV according to the SR synchronous signal SR_sync, and the synchronous rectifier transistor QSR is turned ON for a predetermined ZVS time period T_ZVS by the SR-ZVS pulse PZV (e.g. t1-t2 as shown in FIG. 3). When the synchronous rectifier transistor QSR is turned OFF at the end of the SR-ZVS pulse PZV (e.g. t2), the power transistor QP is turned ON (e.g. t3-t4). As mentioned earlier, during the predetermined ZVS time period T_ZVS (corresponding to the SR-ZVS pulse PZV), the parasitic capacitor Cp of the power transistor QP is discharged substantially to 0V, so the power transistor QP can achieve zero voltage switching when it is turned ON (e.g. t3-t4).

Still referring to FIGS. 4 and 3, in one embodiment, after the synchronous rectifier transistor QSR is turned OFF at the end of the SR-ZVS pulse PZV, a predetermined ZVS delay time period Td (e.g. t2-t3) is provided before the power transistor QP is turned ON. In one embodiment, the predetermined ZVS delay time period Td can ensure that the power transistor QP and the synchronous rectifier transistor QSR are not turned ON at the same time. In one embodiment, the predetermined ZVS delay time period Td can ensure that the power transistor achieves zero voltage switching more precisely (i.e. the drain-source voltage of the power transistor QP is more closer to 0V) when it is turned ON.

Still referring to FIGS. 4 and 3, in one embodiment, the ZVS control circuit (e.g. ZVS control circuit 502) of the present invention controls the operation of the synchronous rectifier transistor QSR (e.g. its turned-ON timing) by the SR-ZVS pulse PZV when the power transformer 10 is operated in a discontinuous current mode (DCM). "Discontinuous current mode" refers to a condition wherein there is a time period between when the power transistor QP is turned OFF and the inductor current reduces to zero in a previous cycle and when the power transistor QP is turned ON and the inductor current starts to increase in a next cycle.

Still referring to FIG. 3, in one embodiment, after the power transistor QP is turned OFF (e.g. t4), the synchronous rectifier transistor QSR is turned ON for the SR time period T_SR (e.g. t5-t6) by the SR-control pulse PSR for synchronous rectification at the secondary side, wherein after the SR-control pulse PSR ends (e.g. t6), the synchronous rectifier transistor QSR is turned ON by the SR-ZVS pulse PZV which is triggered when the SR synchronous signal SR_sync is received (e.g. t7 or t0).

Still referring to FIGS. 4 and 3, in one embodiment, the SR control signal VG generates the SR-ZVS pulse PZV to turn ON the synchronous rectifier transistor QSR when a voltage of a drain terminal of the synchronous rectifier transistor QSR is lower than a low-voltage threshold VT2 (e.g. t0 or t7), whereby the synchronous rectifier transistor QSR can also achieve zero voltage switching to further improve the power conversion efficiency. In another embodiment, the judgment with reference to the low-voltage threshold VT2 can be omitted. In other words, the SR-ZVS pulse PZV can be generated according to other criteria without determining whether the voltage of the drain terminal of the synchronous rectifier transistor QSR is lower than the low-voltage threshold VT2.

Still referring to FIGS. 4 and 3, in one embodiment, after the synchronous rectifier transistor QSR is turned OFF at the end of the SR-ZVS pulse PZV, the ZVS delay time period Td is started when a voltage of an auxiliary winding WA of the power transformer 10 is lower than a primary-side-winding threshold VT1 (e.g. t2'), whereby more precise zero voltage switching of the power transistor QP can be ensured. As shown in FIG. 4, in one embodiment, the primary side controller circuit 100 is coupled to the auxiliary winding WA to receive the voltage across the auxiliary winding WA or a related signal thereof. However in another embodiment, the judgment with reference to the primary-side-winding threshold VT1 can be omitted.

In one embodiment, the pulse width of the SR synchronous signal SR_sync determines the starting timing of the SR-ZVS pulse PZV. In the embodiment of FIG. 3, the SR-ZVS pulse PZV is triggered by the falling edge of the SR synchronous signal SR_sync. However this is not to limit the scope of the present invention; in another embodiment, the SR-ZVS pulse PZV can be triggered by the rising edge of the SR synchronous signal SR_sync.

Still referring to FIG. 4, in one embodiment, the primary side controller circuit 100 determines a switching frequency Fs of the SR synchronous signal SR_sync. In one embodiment, the primary side controller circuit 100 includes an oscillator 110 which is configured to operably generate the SR synchronous signal SR_sync and determine the switching frequency Fs of the SR synchronous signal SR_sync (and hence the switching frequency of the switching signal Vs as well). In one embodiment, the frequency Fs can be a fixed value (for example the flyback power converter 4 is operated by a fixed frequency), or an adjustable variable (for example the flyback power converter 4 is operated by a non-fixed frequency).

In one preferred embodiment, the pulse width T_sync of the SR synchronous signal SR_sync can occupy only a very small duty ratio of the whole period of the SR synchronous signal SR_sync. In one embodiment, the pulse width T_sync of the SR synchronous signal SR_sync is shorter than 1 μsec.

Figure 5:
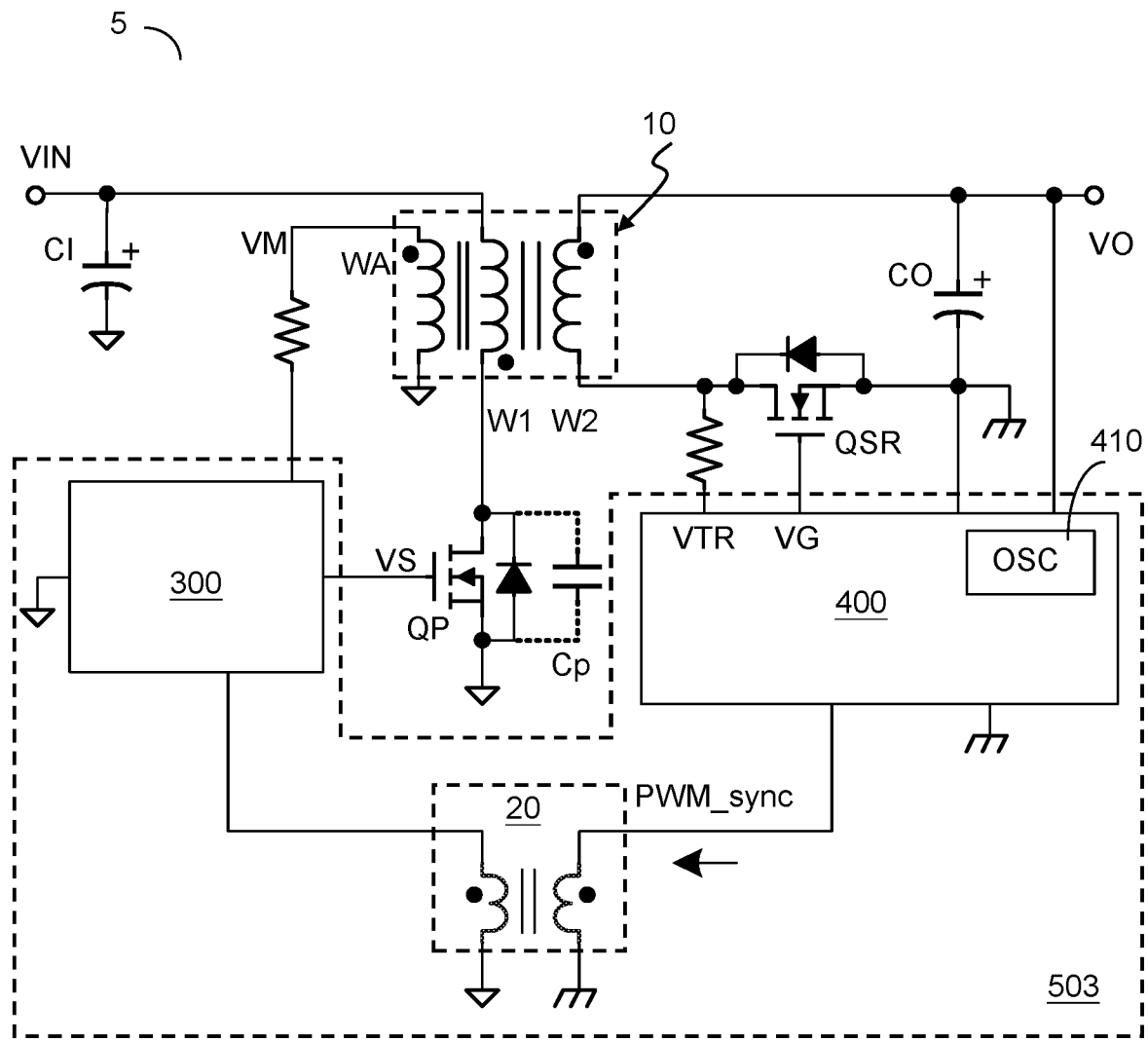
FIG. 5 shows a schematic diagram of another embodiment of the ZVS control circuit according to the present invention.
Figure 6:
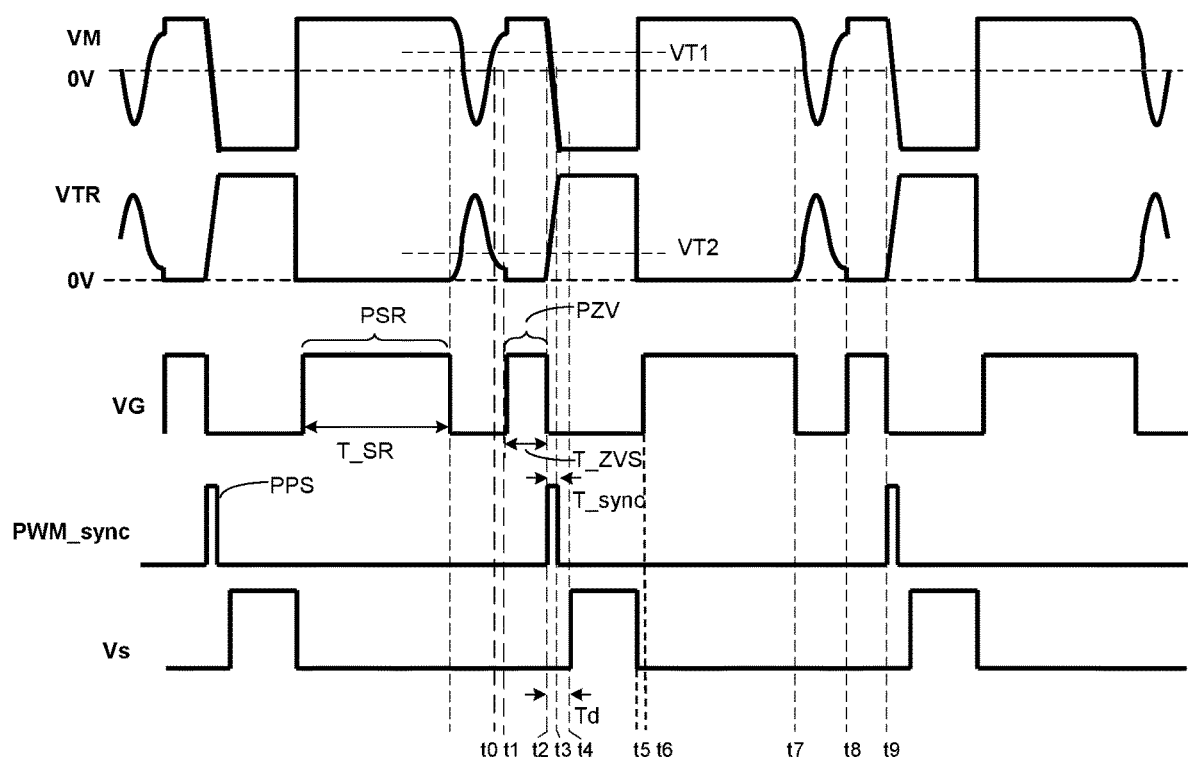
FIG. 6 shows waveforms corresponding to the embodiment of the ZVS control circuit shown in FIG. 5.

FIG. 5 shows a schematic diagram of another embodiment of the ZVS control circuit according to the present invention (ZVS control circuit 503). FIG. 6 shows waveforms corresponding to the embodiment of the ZVS control circuit shown in FIG. 5.

As shown in FIG. 5, the ZVS control circuit 503 is similar to the ZVS control circuit 502 but is different in that the pulse transformer 20 of the ZVS control circuit 503 is configured to operably couple the PWM synchronous signal PWM_sync from the secondary side controller circuit 400 to the primary side controller circuit 300, so as to generate the switching signal Vs for the power transistor QP to control the power transformer 10 to generate the output voltage.

Still referring to FIGS. 5 and 6, in this embodiment, the SR control signal VG also includes an SR-control pulse PSR and an SR-ZVS pulse PZV. Before the PWM synchronous signal PWM_sync delivers a synchronous pulse PPS, the synchronous rectifier transistor QSR is turned ON for a predetermined ZVS time period T_ZVS (e.g. t1-t2 shown in FIG. 6) by the SR-ZVS pulse PZV. When the synchronous rectifier transistor QSR is turned OFF at the end of the SR-ZVS pulse PZV (e.g. t2 shown in FIG. 6), the PWM synchronous signal PWM_sync is generated to trigger the power transistor QP to be turned ON (e.g. by the switching signal Vs, t4-t5 shown in FIG. 6) to achieve zero voltage switching. Similar to the operation of the embodiment shown in FIG. 3, in this embodiment, after the synchronous rectifier transistor QSR is turned ON for a predetermined ZVS time period T_ZVS, the primary side winding W1 can induce a circulation current Ip to discharge the parasitic capacitor CP of the power transistor QP substantially to 0V. Then, when the PWM synchronous signal PWM_sync is generated to trigger the power transistor QP to be turned ON, the power transistor QP can achieve zero voltage switching.

Still referring to FIG. 6, in one embodiment, after the synchronous rectifier transistor QSR is turned OFF at the end of the SR-ZVS pulse PZV, the power transistor QP is turned ON after a predetermined ZVS delay time period Td (e.g. t2-t4 shown in FIG. 6). In one embodiment, the predetermined ZVS delay time period Td can ensure that the power transistor QP and the synchronous rectifier transistor QSR are not turned ON at the same time. In one embodiment, the predetermined ZVS delay time period Td can ensure that the power transistor achieves zero voltage switching more precisely when it is turned ON.

Still referring to FIG. 6, in one embodiment, the ZVS control circuit 503 controls the synchronous rectifier transistor QSR to be turned ON by the SR-ZVS pulse PZV when the power transformer 10 is operated in a discontinuous current mode (DCM).

Still referring to FIG. 6, in one embodiment, the SR-ZVS pulse PZV controls the synchronous rectifier transistor QSR to be ON for the predetermined ZVS time period T_ZVS when a voltage of a drain terminal of the synchronous rectifier transistor QSR is lower than a low-voltage threshold VT2 (e.g. t0 shown in FIG. 6).

Figure 7A:
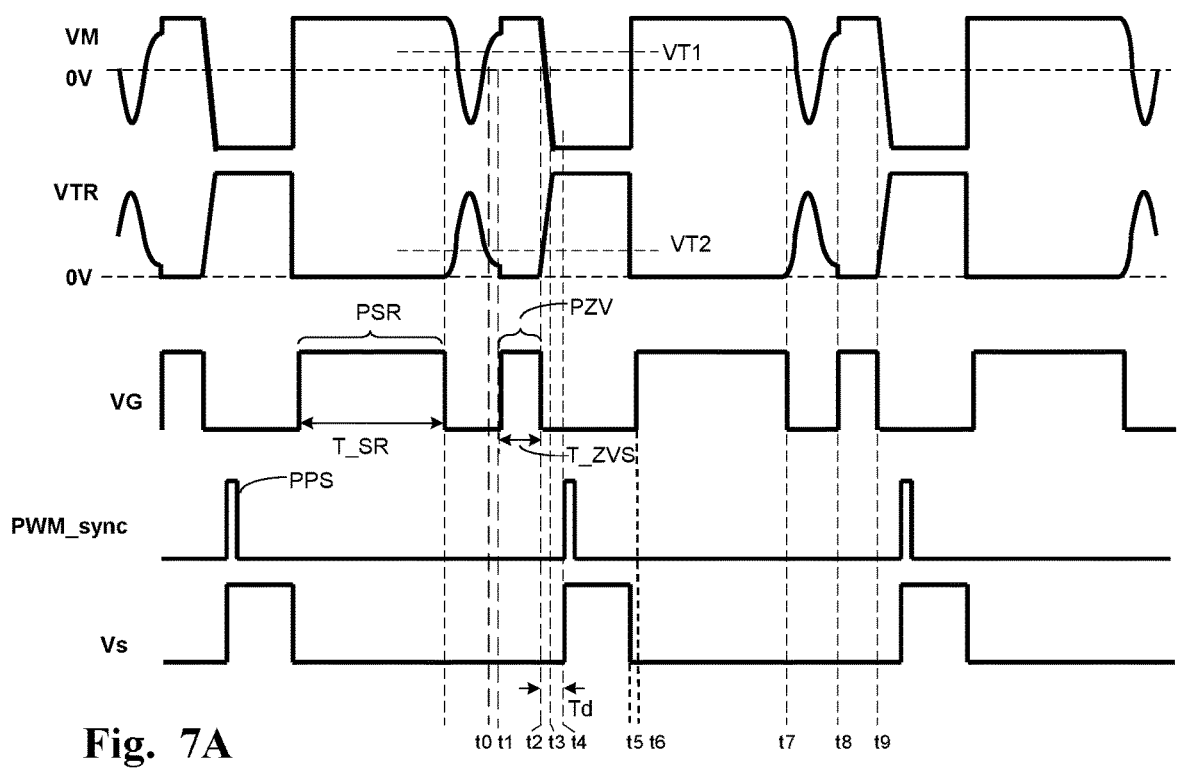
FIGS. 7A-7B show waveforms corresponding to the embodiment of the ZVS control circuit shown in FIG. 5.
Figure 7B:
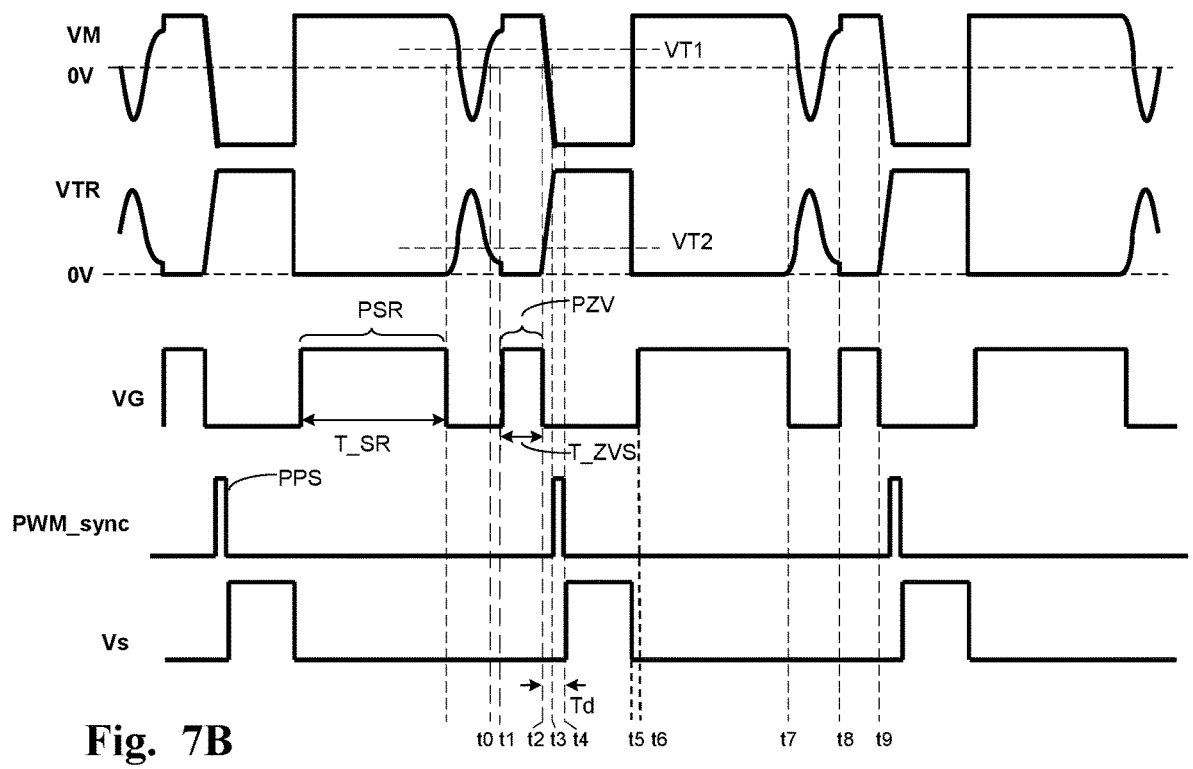

In one embodiment, the ZVS delay time period Td can be started by the secondary side controller circuit 400 after the synchronous rectifier transistor QSR is turned OFF at the end of the SR-ZVS pulse PZV. In one embodiment, the switching signal Vs can be triggered by the rising edge (e.g. t2 shown in FIG. 6) of the synchronous pulse PPS of the PWM synchronous signal PWM_sync as shown in FIG. 6, with the ZVS delay time period Td (i.e. Td is from t2 to t4 as shown in FIG. 6), to turn ON the power transistor QP. However, this embodiment is not for limiting the scope of the present invention. In other embodiments, the switching signal Vs can be triggered by the falling edge (such as t3 as shown in FIG. 6) of the synchronous pulse PPS of the PWM synchronous signal PWM_sync. In this case, the ZVS delay time period Td corresponds to the period from t3 to t4 in FIG. 6. In one embodiment, referring to FIGS. 7A and 7B, the switching signal Vs can be triggered to turn ON the power transistor QP by the rising edge (e.g. t4 shown in FIG. 7A) or the falling edge (e.g. t4 shown in FIG. 7B) of the synchronous pulse PPS of the PWM synchronous signal PWM_sync, wherein the synchronous pulse PPS is triggered at a time point with a ZVS delay time period Td after the synchronous rectifier transistor QSR is turned OFF at the end of the SR-ZVS pulse PZV.

Still referring to FIG. 5, in one embodiment, the secondary side controller circuit 400 determines a switching frequency Fs' of the switching signal Vs. In one embodiment, the secondary side controller circuit 400 includes an oscillator 410 which is configured to operably generate the PWM synchronous signal PWM_sync and determine the switching frequency Fs' of the PWM synchronous signal PWM_sync (and hence the switching frequency of the switching signal Vs as well). In one embodiment, the frequency Fs' can be a fixed value (for example the flyback power converter 5 is operated by a fixed frequency), or an adjustable variable (for example the flyback power converter 5 is operated by a non-fixed frequency).

In one preferred embodiment, a pulse width T_sync of the PWM synchronous signal PWM_sync can occupy only a very small duty ratio of the whole period of the PWM synchronous signal PWM_sync. In one embodiment, the pulse width T_sync of the PWM synchronous signal PWM_sync is shorter than 1 μsec.

In one embodiment, the SR-ZVS pulse PZV is not generated during a light load condition of the flyback power converter. In other words, in this embodiment, when the flyback power converter operates at a light load condition (for example when the load current of a load coupled to the flyback power converter is lower than a predetermined threshold), the synchronous rectifier transistor QSR is switching without the SR-ZVS pulse PZV. From one perspective, the ZVS control circuit of the present invention can determine whether to generate the SR-ZVS pulse PZV according to the load condition. When the load current is in a light load or an ultra-light load condition, the ZVS control circuit (e.g. ZVS control circuit 501, 502 or 503) does not generate the SR-ZVS pulse PZV, whereby the power conversion efficiency can be further improved due to less switching events.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A zero voltage switching (ZVS) control circuit, configured to operably control a flyback power converter, the ZVS control circuit comprising:

a primary side controller circuit, configured to operably generate a switching signal and an SR synchronous signal, wherein the switching signal controls a power transformer through a power transistor to generate an output voltage;

a secondary side controller circuit, configured to operably generate an SR control signal for controlling a synchronous rectifier transistor at a secondary side of the power transformer, wherein the SR control signal includes an SR-control pulse and an SR-ZVS pulse, wherein the SR-control pulse controls the synchronous rectifier transistor to be ON for an SR time period; and a pulse transformer, configured to couple the SR synchronous signal from the primary side controller circuit to the secondary side controller circuit to generate the SR control signal;

wherein the SR control signal is triggered to generate the SR-ZVS pulse according to the SR synchronous signal, and the synchronous rectifier transistor is turned ON for a predetermined ZVS time period by the SR-ZVS pulse; wherein when the synchronous rectifier transistor is turned OFF at an end of the SR-ZVS pulse, the power transistor is turned ON, to achieve zero voltage switching;

wherein the SR control signal generates the SR-ZVS pulse to turn ON the synchronous rectifier transistor when a voltage of a drain terminal of the synchronous rectifier transistor is lower than a low-voltage threshold.

2. The ZVS control circuit as claim 1, wherein after the synchronous rectifier transistor is turned OFF at the end of the SR-ZVS pulse, the power transistor is turned ON after a predetermined ZVS delay time period from a turned-OFF timing of the synchronous rectifier transistor.

3. The ZVS control circuit as claim 2, wherein after the synchronous rectifier transistor is turned OFF at the end of the SR-ZVS pulse, the ZVS delay time period is started when a voltage of an auxiliary winding of the power transformer is lower than a primary-side-winding threshold, wherein the auxiliary winding is coupled to the primary side controller circuit.

4. The ZVS control circuit as claim 1, wherein the synchronous rectifier transistor is turned ON by the SR-ZVS pulse when the power transformer is operated in a discontinuous current mode (DCM).

5. The ZVS control circuit as claim 1, wherein after the power transistor is turned OFF, the synchronous rectifier transistor is turned ON for the SR time period by the SR-control pulse for synchronous rectification at the secondary side, wherein after the SR-control pulse ends, the synchronous rectifier transistor is turned ON by the SR-ZVS pulse which is triggered when the SR synchronous signal is received.

6. The ZVS control circuit as claim 1, wherein a pulse width of the SR synchronous signal determines the starting timing of the SR-ZVS pulse.

7. The ZVS control circuit as claim 1, wherein the primary side controller circuit determines a switching frequency of the SR synchronous signal or the switching signal.

8. The ZVS control circuit as claim 1, wherein a pulse width of the SR synchronous signal is shorter than 1 µsec.

9. A zero voltage switching (ZVS) control circuit, configured to operably control a flyback power converter, the ZVS control circuit comprising:
   a primary side controller circuit, configured to operably generate a switching signal which controls a power transformer through a power transistor to generate an output voltage;
   a secondary side controller circuit, configured to operably generate an SR control signal and a PWM synchronous signal, wherein the SR control signal controls a synchronous rectifier transistor, wherein the SR control signal includes an SR-control pulse and an SR-ZVS pulse, wherein the SR-control pulse controls the synchronous rectifier transistor to be ON for an SR time period; and
   a pulse transformer, configured to operably couple the PWM synchronous signal from the secondary side controller circuit to the primary side controller circuit to generate the switching signal;
   wherein before the PWM synchronous signal delivers a synchronous pulse, the synchronous rectifier transistor is turned ON for a predetermined ZVS time period by the SR-ZVS pulse; wherein when the synchronous rectifier transistor is turned OFF at the end of the SR-ZVS pulse, the PWM synchronous signal is generated to trigger the power transistor to be turned ON, to achieve zero voltage switching;
   wherein the SR-ZVS pulse controls the synchronous rectifier transistor to be ON for the predetermined ZVS time period when a voltage of a drain terminal of the synchronous rectifier transistor is lower than a low-voltage threshold.

10. The ZVS control circuit as claim 9, wherein after the synchronous rectifier transistor is turned OFF at the end of the SR-ZVS pulse, the power transistor is turned ON after a predetermined ZVS delay time period from a turned-OFF timing of the synchronous rectifier transistor.

11. The ZVS control circuit as claim 10, wherein the secondary side controller circuit starts the ZVS delay time period after the synchronous rectifier transistor is turned OFF at the end of the SR-ZVS pulse.

12. The ZVS control circuit as claim 9, wherein the synchronous rectifier transistor is turned ON by the SR-ZVS pulse when the power transformer is operated in a discontinuous current mode (DCM).

13. The ZVS control circuit as claimed in claim 9, wherein the SR-ZVS pulse is not generated when a load current of a load coupled to the the flyback power converter is lower than a predetermined threshold.

14. The ZVS control circuit as claim 9, wherein the secondary side controller circuit determines a switching frequency of the switching signal.

15. The ZVS control circuit as claim 9, wherein a pulse width of the PWM synchronous signal is shorter than 1 µsec.

16. A zero voltage switching (ZVS) control circuit, configured to operably control a flyback power converter, the ZVS control circuit comprising:
   a primary side controller circuit, configured to operably generate a switching signal and an SR synchronous signal, wherein the switching signal controls a power transformer through a power transistor to generate an output voltage;
   a secondary side controller circuit, configured to operably generate an SR control signal for controlling a synchronous rectifier transistor at a secondary side of the power transformer, wherein the SR control signal includes an SR-control pulse and an SR-ZVS pulse, wherein the SR-control pulse controls the synchronous rectifier transistor to be ON for an SR time period; and
   a pulse transformer, configured to couple the SR synchronous signal from the primary side controller circuit to the secondary side controller circuit to generate the SR control signal;
   wherein the SR control signal is triggered to generate the SR-ZVS pulse according to the SR synchronous signal, and the synchronous rectifier transistor is turned ON for a predetermined ZVS time period by the SR-ZVS pulse; wherein when the synchronous rectifier transistor is turned OFF at an end of the SR-ZVS pulse, the power transistor is turned ON, to achieve zero voltage switching;
   wherein after the synchronous rectifier transistor is turned OFF at the end of the SR-ZVS pulse, the power transistor is turned ON after a predetermined ZVS delay time period from a turned-OFF timing of the synchronous rectifier transistor;
   wherein after the synchronous rectifier transistor is turned OFF at the end of the SR-ZVS pulse, the ZVS delay time period is started when a voltage of an auxiliary winding of the power transformer is lower than a primary-side-winding threshold, wherein the auxiliary winding is coupled to the primary side controller circuit.

\* \* \* \* \*